(12) United States Patent
Mueller et al.

(10) Patent No.: US 8,238,638 B2
(45) Date of Patent: Aug. 7, 2012

(54) TAG VALIDATION FOR EFFICIENTLY ASSESSING ELECTRONIC CHECK IMAGE QUALITY

(75) Inventors: Randall Lee Mueller, Kansas City, MO (US); Thomas Edwin Schaadt, Westerville, OH (US); Benjamin T. Breeden, Jr., Eldersburg, MD (US); V. Srinivas Nori, Norcross, GA (US)

(73) Assignees: Federal Reserve Bank of Kansas City, Kansas City, MO (US); Federal Reserve Bank of Richmond, Richmond, VA (US); Federal Reserve Bank of Cleveland, Cleveland, OH (US); Federal Reserve Bank of Atlanta, Atlanta, GA (US)

( * ) Notice: Subject to any disclaimer, the term of this patent is extended or adjusted under 35 U.S.C. 154(b) by 1219 days.

(21) Appl. No.: 12/012,079

(22) Filed: Jan. 31, 2008

(65) Prior Publication Data

US 2009/0196485 A1    Aug. 6, 2009

(51) Int. Cl.
*G06K 9/00* (2006.01)
(52) U.S. Cl. .................................... 382/137
(58) Field of Classification Search .............. 382/100, 382/135–140; 194/4–12; 209/534–540; 235/379–388; 250/200–210; 356/71–77; 902/7–11; 705/45–50
See application file for complete search history.

(56) References Cited

U.S. PATENT DOCUMENTS

| | | | |
|---|---|---|---|
| 4,264,808 A | 4/1981 | Owens et al. | |
| 4,270,042 A | 5/1981 | Case | |
| 4,523,330 A | 6/1985 | Cain | |
| 4,694,397 A | 9/1987 | Grant et al. | |
| 4,823,264 A | 4/1989 | Deming | |
| 4,948,174 A | 8/1990 | Thomson et al. | |
| 4,974,878 A | 12/1990 | Josephson | |
| 5,038,283 A | 8/1991 | Caveney | |
| 5,120,944 A | 6/1992 | Kern et al. | |
| 5,121,945 A | 6/1992 | Thomson et al. | |
| 5,187,750 A | 2/1993 | Behera | |
| 5,198,975 A | 3/1993 | Baker et al. | |
| 5,237,159 A | 8/1993 | Stephens et al. | |
| 5,265,007 A | 11/1993 | Barnhard, Jr. et al. | |

(Continued)

OTHER PUBLICATIONS

"Vision, Strategy & Approach to Image Quality & Archive Integrity, A Review of Carreker's Current Initiatives Towards Image Quality Detection & Resolution", Federal Reserve System. Aug. 19, 2003, Copyright © 2003 Carreker Corporation, pp. 1-43.

(Continued)

*Primary Examiner* — Atiba O Fitzpatrick
(74) *Attorney, Agent, or Firm* — King & Spalding

(57) ABSTRACT

Efficiently assessing the quality of an electronic check image by determining whether the check image is suitable for image quality analysis prior to performing the image quality analysis. A check processing module of a check processor can determine whether the check image is suitable for image quality analysis by validating certain tags in the image. For example, such validation can include determining whether the check image includes certain mandatory tags and whether any optional tags present in the image are valid. The check processing module can determine that the check image is not suitable for image quality analysis if it does not include the mandatory tags or if it includes any invalid optional tags. The check processing module can assign a failure value to any check image that is not suitable for image quality analysis. The failure value can indicate a reason for the unsuitability of the check image.

15 Claims, 4 Drawing Sheets

U.S. PATENT DOCUMENTS

| | | |
|---|---|---|
| 5,373,550 A | 12/1994 | Campbell et al. |
| 5,412,190 A | 5/1995 | Josephson et al. |
| 5,583,759 A | 12/1996 | Geer |
| 5,600,732 A | 2/1997 | Ott et al. |
| 5,668,897 A | 9/1997 | Stolfo |
| 5,677,955 A | 10/1997 | Doggett et al. |
| 5,680,611 A | 10/1997 | Rail et al. |
| 5,687,250 A | 11/1997 | Curley et al. |
| 5,689,579 A | 11/1997 | Josephson |
| 5,692,065 A | 11/1997 | Prakash et al. |
| 5,754,674 A | 5/1998 | Ott et al. |
| 5,783,808 A | 7/1998 | Josephson |
| 5,790,717 A | 8/1998 | Judd |
| 5,819,236 A | 10/1998 | Josephson |
| 5,832,140 A | 11/1998 | Stapleton et al. |
| 5,930,778 A | 7/1999 | Geer |
| 5,937,084 A | 8/1999 | Crabtree et al. |
| 5,940,524 A | 8/1999 | Murayama et al. |
| 5,963,654 A | 10/1999 | Prakash et al. |
| 6,019,282 A | 2/2000 | Thompson et al. |
| 6,097,834 A | 8/2000 | Krouse et al. |
| 6,115,509 A | 9/2000 | Yeskel |
| 6,170,744 B1 | 1/2001 | Lee et al. |
| 6,236,756 B1 | 5/2001 | Kimura et al. |
| 6,243,689 B1 | 6/2001 | Norton |
| 6,351,546 B1 | 2/2002 | Murayama et al. |
| 6,351,553 B1 | 2/2002 | Hayosh |
| 6,450,403 B1 | 9/2002 | Martens et al. |
| 6,571,000 B1 | 5/2003 | Rasmussen et al. |
| 6,577,761 B1 | 6/2003 | Kanno et al. |
| 6,585,775 B1 | 7/2003 | Cosentino et al. |
| 6,658,139 B1 | 12/2003 | Cookingham et al. |
| 6,717,592 B2 | 4/2004 | Gusler et al. |
| 6,792,133 B2 | 9/2004 | Ott et al. |
| 6,850,950 B1 | 2/2005 | Clarke et al. |
| 6,854,656 B2 | 2/2005 | Matsumori |
| 6,912,297 B2 | 6/2005 | Scott et al. |
| 6,963,885 B2 | 11/2005 | Calkins et al. |
| 6,996,263 B2 | 2/2006 | Jones et al. |
| 7,000,828 B2 | 2/2006 | Jones |
| 7,066,668 B2 | 6/2006 | Sandison et al. |
| 7,066,669 B2 | 6/2006 | Lugg |
| 7,082,216 B2 | 7/2006 | Jones et al. |
| 7,092,560 B2 | 8/2006 | Jones et al. |
| 7,099,845 B2 | 8/2006 | Higgins et al. |
| 7,120,606 B1 | 10/2006 | Ranzini et al. |
| 7,167,580 B2 | 1/2007 | Klein et al. |
| 7,283,656 B2 | 10/2007 | Blake et al. |
| 7,386,511 B2 | 6/2008 | Buchanan et al. |
| 7,539,646 B2 | 5/2009 | Gilder et al. |
| 7,546,275 B1 | 6/2009 | Herzberg et al. |
| 2001/0039534 A1 | 11/2001 | Keene |
| 2001/0051921 A1 | 12/2001 | Garner, IV et al. |
| 2002/0150279 A1 | 10/2002 | Scott et al. |
| 2003/0158811 A1 | 8/2003 | Sanders et al. |
| 2003/0202690 A1 | 10/2003 | Jones et al. |
| 2003/0208421 A1 | 11/2003 | Vicknair et al. |
| 2003/0225704 A1 | 12/2003 | Park et al. |
| 2004/0030621 A1 | 2/2004 | Cobb |
| 2004/0068464 A1 | 4/2004 | Buchanan et al. |
| 2004/0109596 A1 | 6/2004 | Doran |
| 2004/0133516 A1 | 7/2004 | Buchanan et al. |
| 2004/0143621 A1 | 7/2004 | Fredrickson et al. |
| 2004/0148235 A1 | 7/2004 | Craig et al. |
| 2004/0181485 A1 | 9/2004 | Finch et al. |
| 2004/0218203 A1 | 11/2004 | Mastie et al. |
| 2004/0236688 A1 | 11/2004 | Bozeman |
| 2005/0018896 A1 | 1/2005 | Heit et al. |
| 2005/0044043 A1* | 2/2005 | Gooding et al. ............... 705/42 |
| 2005/0071283 A1 | 3/2005 | Randle et al. |
| 2005/0080719 A1 | 4/2005 | Sellen et al. |
| 2005/0080738 A1 | 4/2005 | Sellen et al. |
| 2005/0086136 A1 | 4/2005 | Love et al. |
| 2005/0097046 A1 | 5/2005 | Singfield |
| 2005/0097050 A1 | 5/2005 | Orcutt |
| 2005/0109833 A1 | 5/2005 | Page |
| 2005/0129300 A1 | 6/2005 | Sandison et al. |
| 2005/0139670 A1 | 6/2005 | McGlamery et al. |
| 2005/0144131 A1 | 6/2005 | Aziz |
| 2005/0171899 A1 | 8/2005 | Dunn et al. |
| 2005/0175221 A1 | 8/2005 | Scott et al. |
| 2005/0203857 A1 | 9/2005 | Friedman |
| 2005/0211763 A1 | 9/2005 | Sgambati et al. |
| 2005/0213805 A1* | 9/2005 | Blake et al. ............... 382/137 |
| 2005/0220324 A1 | 10/2005 | Klein et al. |
| 2005/0238252 A1 | 10/2005 | Prakash et al. |
| 2005/0243378 A1 | 11/2005 | Klein et al. |
| 2005/0243379 A1 | 11/2005 | Klein et al. |
| 2005/0244035 A1 | 11/2005 | Klein et al. |
| 2005/0252960 A1 | 11/2005 | Murata |
| 2005/0256839 A1 | 11/2005 | Leong et al. |
| 2005/0281448 A1 | 12/2005 | Lugg |
| 2006/0006222 A1 | 1/2006 | Brey et al. |
| 2006/0023930 A1 | 2/2006 | Patel et al. |
| 2006/0041506 A1* | 2/2006 | Mason et al. ............... 705/42 |
| 2006/0045321 A1 | 3/2006 | Yu |
| 2006/0045600 A1 | 3/2006 | Lugg |
| 2006/0080245 A1 | 4/2006 | Bahl et al. |
| 2006/0106717 A1 | 5/2006 | Randle et al. |
| 2006/0112013 A1 | 5/2006 | Maloney |
| 2006/0118613 A1 | 6/2006 | McMann et al. |
| 2006/0133277 A1 | 6/2006 | Carozza et al. |
| 2006/0167784 A1 | 7/2006 | Hoffberg |
| 2006/0182331 A1 | 8/2006 | Gilson et al. |
| 2006/0182332 A1 | 8/2006 | Weber |
| 2006/0184441 A1 | 8/2006 | Haschka et al. |
| 2006/0186194 A1 | 8/2006 | Richardson et al. |
| 2006/0188310 A1 | 8/2006 | Sandison et al. |
| 2006/0188311 A1 | 8/2006 | Lugg |
| 2006/0191998 A1 | 8/2006 | Mueller et al. |
| 2006/0206427 A1 | 9/2006 | Love et al. |
| 2006/0212391 A1 | 9/2006 | Norman et al. |
| 2006/0229987 A1 | 10/2006 | Leekley |
| 2006/0237526 A1 | 10/2006 | Mueller et al. |
| 2006/0248009 A1 | 11/2006 | Hicks et al. |
| 2006/0280354 A1 | 12/2006 | Murray |
| 2007/0095888 A1 | 5/2007 | Mueller et al. |
| 2007/0100672 A1 | 5/2007 | McBrida et al. |
| 2007/0156438 A1 | 7/2007 | Popadic et al. |
| 2007/0235518 A1 | 10/2007 | Mueller et al. |
| 2007/0244782 A1 | 10/2007 | Chimento |
| 2007/0288382 A1 | 12/2007 | Narayanan et al. |
| 2008/0006687 A1 | 1/2008 | Mueller et al. |
| 2008/0097899 A1 | 4/2008 | Jackson et al. |
| 2008/0103790 A1 | 5/2008 | Abernethy et al. |
| 2008/0159655 A1 | 7/2008 | Breeden |
| 2008/0162319 A1 | 7/2008 | Breeden et al. |
| 2008/0162320 A1 | 7/2008 | Mueller et al. |
| 2008/0162321 A1 | 7/2008 | Breeden et al. |
| 2008/0162322 A1 | 7/2008 | Breeden et al. |
| 2008/0247629 A1 | 10/2008 | Gilder et al. |

OTHER PUBLICATIONS

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check 21?", VSOFT Corporation, available at http://www.vsoftcorp.com/check21.htm.

"Check21 Cash Letter: Clear Check Images Rather than Paper Checks", SYMITAR, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Excerpt of Bank of America checking account statement, with personal information redacted, Aug. 2008.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008, 5 pages.

Labaze, U.S. Appl. No. 11/482,360, Office Action, Sep. 23, 2009, 8 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.com/solutions_7.htm> retrieved Apr. 26, 2011 (6 pages).

* cited by examiner

TAG VALIDATION FOR EFFICIENTLY ASSESSING ELECTRONIC CHECK IMAGE QUALITY

RELATED PATENT APPLICATION

This application is related to U.S. patent application Ser. No. 11/079,120, filed Mar. 14, 2005 and entitled "Assessing Electronic Image Quality," the complete disclosure of which is hereby fully incorporated herein by reference.

FIELD OF THE INVENTION

The invention generally relates to analyzing the quality of electronic images. More particularly, the invention relates to efficiently assessing electronic check image quality by validating tags of an electronic check image to determine whether the electronic check image is suitable for image quality analysis prior to performing the image quality analysis.

BACKGROUND OF THE INVENTION

Many document processing operations exist that require an image of each document for data processing, archival, or other purposes. For example, in processing bank checks through the commercial banking system, it is desirable to digitally record images of bank checks for data processing and archival purposes. Additionally, it also is desirable to verify the quality of a captured image before the check leaves the possession of the image recording entity. In this way, documents which were not properly imaged may be re-recorded before being destroyed or otherwise taken out of possession of the entity requiring the image.

Electronic check images serve many purposes in check processing. For example, paper checks can be truncated early in the check clearing process if replaced by a suitable electronic check image. Then, the check can be cleared based in the electronic image rather than the paper document. Truncating the paper checks early in the process reduces transportation costs related to moving paper checks among the various banks and other check processors who participate in the process. Check images also can be archived electronically in place of paper checks for later retrieval, if needed.

A relatively new use for electronic check images is to produce a substitute paper check from electronic images of the original paper check. Under the Check Clearing for the 21st Century Act (the "Act"), a paper substitute check meeting specified requirements is the legal equivalent of an original paper check and includes all the information contained on the original check, and a receiving institution is required to accept the substitute check for payment. The Act facilitates check truncation by creating a new negotiable instrument called the substitute check, which permits banks to truncate original checks, to process check information electronically, and to deliver substitute checks to banks that want to continue receiving paper checks.

By agreement, banks also can accept electronic check images as proper presentment for payment. In that case, the check processor can accept image cash letter deposits and can create image cash letter presentment files from items deposited both electronically and physically for forward collection and return.

For an electronic image to be used for any of the previously discussed purposes, the check image must be of sufficient quality to provide the necessary information for each purpose. For example, a substitute check must meet the requirements of the American National Standard Institute ("ANSI") Standard X9.100 to be considered the legal equivalent of a paper check. Accordingly, check images used to produce a substitute check must be of sufficient quality to produce a paper document meeting that standard. Additionally, check images used for electronic check processing must meet the standards set forth in ANSI Standard X9.37 regarding the electronic exchange of check and image data.

Conventional methods for assessing the quality of an electronic check image perform a complete analysis of the electronic check image regardless of whether the image includes requisite image characteristics. For example, conventional methods perform complete analyses of tag image file format "TIFF" images regardless of whether the images include required TIFF tags. For example, ANSI Standard X9.100-181, entitled "Specifications for TIFF Image Format for Image Exchange," identifies certain mandatory TIFF tags for electronic check images. Performing complete image quality analysis of images that are incomplete or otherwise are not suitable for examination is highly inefficient.

Accordingly, a need exists in the art for a more efficient system and method for assessing image quality of electronic check images.

SUMMARY OF THE INVENTION

The invention includes systems and methods for efficiently assessing the quality of electronic check images. Specifically, the invention provides systems and methods for limiting image quality analysis to electronic check images that are suitable for such analysis. For example, image quality analysis can be limited to electronic check images that include certain "mandatory" tags and do not include any invalid "optional" tags.

The mandatory tags are a selection of tags, which must be present in the electronic check image for the image to be suitable for image quality analysis. For example, the selection of mandatory tags can include tags required in accordance with a bank-specific standard and/or an industry standard, such as ANSI X9.100-181, entitled "Specifications for TIFF Image Format for Image Exchange." The optional tags are tags, which do not have to be present in the electronic check image for the image to be suitable for image quality analysis. For example, the optional tags can include tags identified as "optional" in a bank-specific standard and/or an industry standard, such as ANSI X9.100-181, entitled "Specifications for TIFF Image Format for Image Exchange." In certain exemplary embodiments, any optional tags present in the electronic check image must be "valid," i.e., in a correct format or including appropriate content, for the electronic check image to be suitable for image quality analysis.

The term "tag" is used herein to refer to information in an electronic image file that relates to certain characteristics of the image, such as a size, geometry, or arrangement of the image. For example, tagged image file format ("TIFF") image files can include multiple images and data in a single file through inclusion of tags in a file header. The term "selection" is used herein to mean "at least one." Thus, the phrase "selection of mandatory tags" is used herein to refer to at least one tag.

In certain exemplary embodiments, a check processor receives an electronic check image from a sending institution or generates an electronic check image based on a paper check from a sending institution. For example, the check processor can generate an electronic check image using a MICR/image capturing device. A check processing module of the check processor determines whether the electronic check image is suitable for image quality analysis prior to performing such analysis. In certain exemplary embodiments, the check processing module can determine whether the electronic check image is suitable for image quality analysis by reading one or more tags in the electronic check image and determining whether the tags meet a tag standard. For example, the tag standard can include a requirement that the tags include certain mandatory tags and/or a requirement that the tags do not include any invalid optional tags. In certain exemplary embodiments, the tag standard and/or lists of the mandatory and/or optional tags can be stored in a database of the check processor.

If the processing module determines that the tags in the electronic check image meet the tag standard, then the check processing module can determine that the electronic check image is suitable for image quality analysis. Similarly, if the check processing module determines that the tags in the electronic check image do not meet the tag standard, then the check processing module can determine that the electronic check image is not suitable for image quality analysis.

In certain exemplary embodiments, the check processing module can assign a failure value to an electronic check image determined to be unsuitable for image quality analysis. The failure value includes information regarding the unsuitability of the image, such as a reason why the image is not suitable for image quality analysis. In certain exemplary embodiments, the check processing module can store the failure value in a database of the check processor. The check processing module also can report the failure value to an entity that created the electronic check image. For example, the check processing module can report the failure value to the sending institution or an operator of the check processor. In certain exemplary embodiments, the sending institution or operator can use the failure value to correct the image or to create a new, suitable image for processing.

These and other aspects, objects, features, and advantages of the invention will become apparent to those skilled in the art upon consideration of the following detailed description of illustrated exemplary embodiments, which include the best mode of carrying out the invention as presently perceived.

DETAILED DESCRIPTION OF EXEMPLARY EMBODIMENTS

The invention is directed to efficiently assessing image quality of electronic check images. In particular, the invention is directed to efficiently assessing electronic check image quality by determining whether an electronic check image is suitable for image quality analysis prior to performing the image quality analysis. For example, in one aspect of the invention, a check processing module of a check processor can validate tags of an electronic check image before the check processor performs an in-depth quality analysis of the image. Limiting image quality analysis to images with successfully validated tags improves efficiency in the image quality analysis process.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
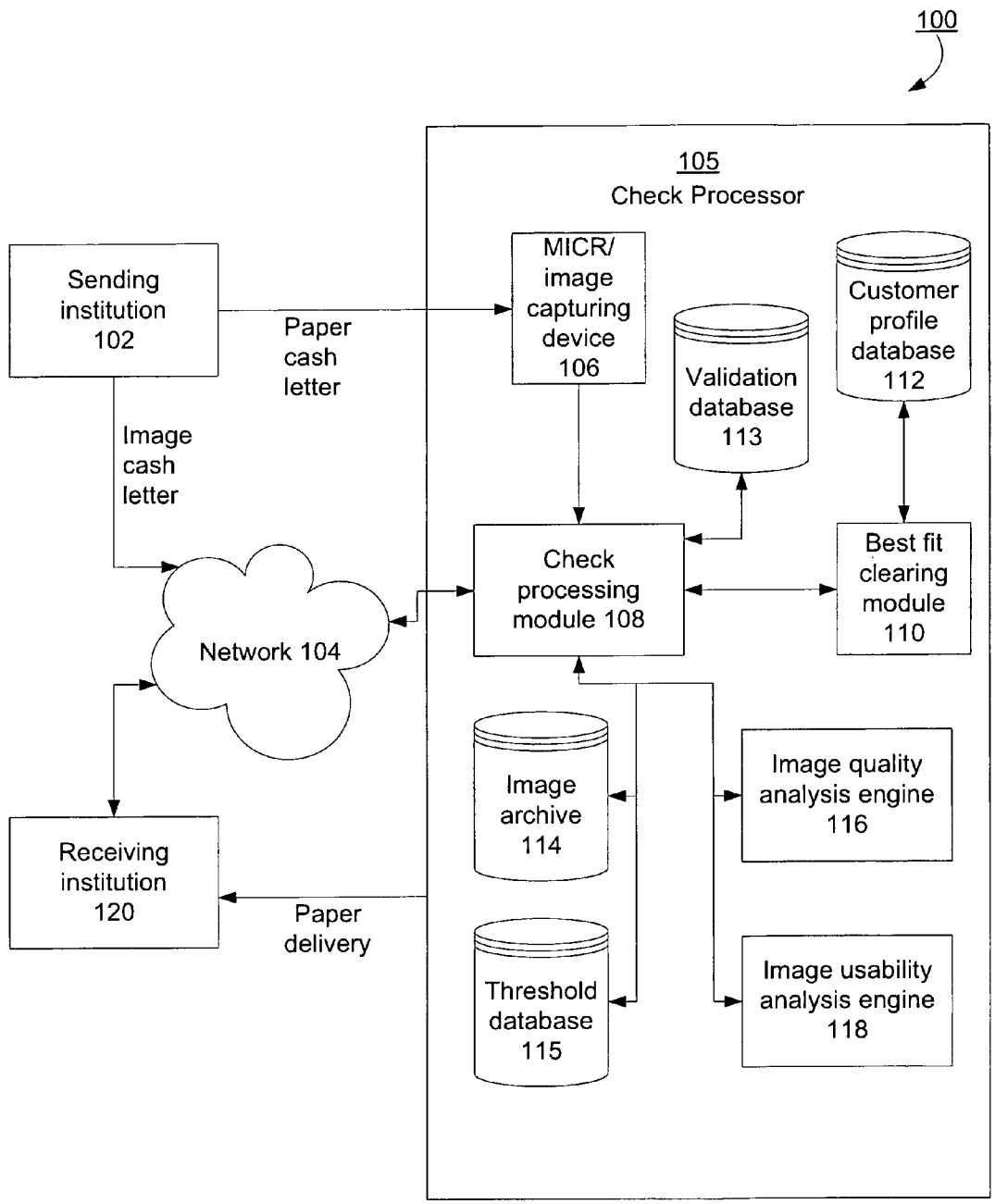
FIG. 1 is a block diagram illustrating a system for efficiently assessing electronic image quality, in accordance with certain exemplary embodiments of the invention.

FIG. 1 is a block diagram illustrating a system 100 for efficiently assessing electronic image quality, in accordance with certain exemplary embodiments of the invention. As shown in FIG. 1, a sending institution 102 can send an image cash letter to a check processor 105 via a computer network 104. For example, the network 104 can include any wired or wireless telecommunication means by which computerized devices can exchange data, including for example, a local area network (LAN), a wide area network (WAN), an intranet, an Internet, or any combination thereof. In certain exemplary embodiments, the check processor 105 can include a Federal Reserve Bank or other check processor.

An image cash letter includes data related to one or more checks, including electronic Magnetic Ink Character Recognition ("MICR") data from each check and electronic images of the front and/or back sides of each check. If the sending institution 102 provides an image cash letter, the electronic images and associated financial data in the image cash letter are forwarded to a check processing module 108 of the check processor 105 for processing.

Alternatively, the sending institution 102 can send a paper cash letter to the check processor 105. A paper cash letter includes paper checks. If the sending institution 102 sends a paper cash letter to the check processor 105, the check processor 105 can electronically capture MICR data from each check and images of the front and/or back sides of each check. The check processor 105 can capture that data via a MICR/image capturing device 106, which can include a separate or integrated MICR reader and image capturing device. The MICR/image capturing device 106 can forward the captured electronic data and images to the check processing module 108 for processing.

The check processing module 108 receives the electronic MICR data and images from the image cash letter or from the MICR/image capturing device 106 and stores the electronic images in an image archive 114. The check processing module 108 can determine whether each of the electronic images is suitable for image quality analysis. For example, the check processing module 108 can make this determination by determining whether each electronic image includes a predetermined selection of mandatory tags and whether any optional tags present in the electronic images are invalid. The check processing module 108 can determine not to perform an image quality analysis on each image it determines is not suitable for such analysis. In certain exemplary embodiments, the check processing module 108 can send a notification to the sending institution 102 and/or an operator of the check processor 105, advising the sending institution 102 and/or operator that the image is not suitable and/or requesting submission of a new or corrected, suitable image.

If the check processing module 108 determines that the electronic images are suitable for image quality analysis, then the check processing module 108 communicates the MICR data to a best fit clearing module 110, which determines the best method for clearing and settling the checks and sorts the check data based on that determination. From the MICR data, the best fit clearing module 110 can identify the receiving institution 120 that is the payor for respective checks in the paper cash letter or image cash letter received from the sending institution 102. In certain exemplary embodiments, the best fit clearing module 110 can determine the receiving institution's 120 preferences for receiving information regarding the checks by reading a customer profile associated with the receiving institution 120 in a customer profile database 112.

According to an exemplary embodiment, the best fit clearing module 110 can make the determinations ("arguments") discussed below to sort the electronic check data. The best fit clearing module 110 can select a first check having electronic data (either financial data alone or financial and image data) at the check processing module 108 and sort the first check based on use of some or all of the following arguments:

1. If a MICR codeline of the electronic check data includes an error, then the best fit clearing module 110 can reject the electronic check data. In this case, the best fit clearing module 110 sorts the electronic check data to an internal location for repair by an operator. Examples of MICR codeline errors include incomplete or missing MICR data, such as the routing number, account number, or check number. In certain exemplary embodiments, rejected items can be coded with an "R" for routing to the proper location for correction. To detect a MICR codeline error, the best fit clearing module 110 compares the electronic MICR information to required fields and identifies missing or improperly formatted data.

2. If the electronic check data includes an image error, then the best fit clearing module 110 can specially reject the electronic check data. Specially rejected items can be coded with an "SR" for routing to the proper location for correction or replacement. In this case, if the sending institution 102 provided an image cash letter, then the best fit clearing module 110 sorts the electronic check data for return to the sending institution 102 to provide a satisfactory electronic check image. If the sending institution 102 provided a cash letter, then the best fit clearing module 110 sorts the electronic check data for return to an operator of the check processor 105 to provide a satisfactory electronic check image. To determine if an image includes an error, the check processing module 108 can assess the quality of the image. Exemplary embodiments of assessing image quality are discussed in more detail below.

3. If the check is drawn on a receiving institution 120 having an agreement with the check processor 105 to accept image cash letters, then the best fit clearing module 110 sorts the electronic data as an "image electronic cash letter" and codes the check data with an "I/E." Then, the check processor 105 creates an image cash letter for the receiving institution 120. The best fit clearing module 110 can determine if the receiving institution 120 accepts image cash letters by reading the receiving institution's 120 preset preference associated with its routing number in the customer profile database 112.

4. If the check is drawn on a receiving institution 120 that subscribes to a long-term image archive service provided by the check processor 105, then the best fit clearing module 110 sorts the electronic data for the "image archive" and codes the check data with an "I/A." Then, the check processor 105 forwards the electronic check images with associated financial data to a long-term image archive (not shown). Additionally, the check processor 105 presents the electronic financial data to the receiving institution 120 in an electronic cash letter file without images. The best fit clearing module 110 can determine if the receiving institution 120 subscribes to the image archive service by reading the receiving institution's 120 preset preference associated with its routing number in the customer profile database 112.

5. If the check is drawn on a receiving institution 120 that requires the check processor 105 to present a paper check, then the best fit clearing module 110 sorts the electronic data as requiring an image replacement document, i.e., a substitute check, and codes the check data with an "IRD." Then, the check processor 105 creates a cash letter comprising the substitute check, or alternatively comprising the original paper check if deposited locally with the check processor 105. The best fit clearing module 110 can determine if the receiving institution 120 requires a paper check by reading the receiving institution's 120 preset preference associated with its routing number in the customer profile database 112.

6. If the check is drawn on a receiving institution 120 that does not want to receive paper checks or check images, then the best fit clearing module 110 sorts the electronic data for treatment as an electronic cash letter and codes the check data with an "ECL." Then, the check processor 105 creates an electronic cash letter comprising the electronic financial data and presents the letter to the receiving institution 120. The best fit clearing module 110 can determine if the receiving institution 120 desires an ECL by reading the receiving institution's 120 preset preference associated with its routing number in the customer profile database 112.

7. If the check is drawn on a receiving institution 120 for which a different branch of the check processor 105 is the presenting bank, then the best fit clearing module 110 sorts the electronic data for presentment by a different branch and codes the check data with an identifier of the presenting branch. Then, the best fit clearing module 110 transfers the electronic data to the check processing module of the appropriate presenting branch. The best fit clearing module 110 can determine the presenting branch by reading the receiving institution's 120 preset preference associated with its routing number in the customer profile database 112.

8. For an exemplary operating environment, if the check is drawn on a receiving institution 120 that receives checks presented from any branch regardless of where the receiving institution 120 is located, then the best fit clearing module 110 codes the check data with an "Natl." Thereafter, the check processor 105 prepares the proper presentment form and presents the check to the receiving institution 120. The best fit clearing module 110 can determine if the receiving institution 120 accepts checks presented by any branch by reading the receiving institution's 120 preset preference associated with its routing number in the customer profile database 112.

After sorting the selected check, the best fit clearing module 110 repeats the sort process for the remaining checks.

The check processing module 108 stores multiple purposes for check images in a threshold database 115. In certain exemplary embodiments, the purposes can include the destination or intended use of an image. For example, the purposes can include the uses discussed previously with respect to the best fit clearing module 110. In that case, the purposes can include image electronic cash letter, long-term image archive, substitute check, and electronic cash letter. The purposes can include any suitable destination or use of an electronic image.

The check processing module 108 also can store multiple image quality thresholds in the threshold database 115. The image quality thresholds are associated with respective purposes, thereby indicating different image quality levels required for different purposes. Alternatively, if only a single threshold is used, then the same quality level is required for each purpose.

The check processing module 108 determines whether an image quality rating for a particular electronic image meets the image quality threshold established for the purpose of the particular electronic image to determine whether to accept or reject the particular electronic image (i.e., to determine how to sort the particular electronic image). The check processing module 108 compares the image quality rating for each electronic image with the image quality threshold associated with the respective image's purpose to determine if the electronic image is suitable for its intended purpose. Accordingly, the check processing module 108 can accept or reject images based on different image quality thresholds that each correspond to a destination, use, business case, or other established purpose of the individual images. The best fit clearing module 110 can sort the electronic images based on the different image quality thresholds and can place the electronic images in the proper queue for further processing.

Thus, the check processing module 108 can accept or reject electronic images based on the quality rating and the destination, use, or other purpose of the electronic image. For example, an electronic image received from a sending institution 102 that will be used to produce a substitute check may require a higher quality rating than an image created by the check processor 105 that will be used to produce a substitute check. That difference results from the processor's ability to keep the original check for future reference after it captures the electronic image of the check. Additionally, a very low quality image (or even no image) may suffice for a receiving institution 120 that requires only electronic financial data without an image (an electronic cash letter). Accordingly, in certain exemplary embodiments, the check processing module 108 or best fit clearing module 110 can require a quality rating of "9" for electronic images received from a sending institution 102 for which the check processor 105 will produce a substitute check, a quality rating of "7" for electronic images received from the MICR/image capturing device 106 for which the check processor 105 will produce a substitute check, and a quality rating of "0" or no rating for electronic images corresponding to checks that will be processed via an electronic cash letter (without images).

Exemplary embodiments for generating the image quality rating will now be described. The image quality rating indicates the quality of each respective electronic image. The image quality rating can be generated by any suitable means for detecting the quality or usability of an image. According to exemplary embodiments, the quality rating can include an image quality value produced by an image quality analysis ("IQA") engine 116, an image confidence score produced by an image usability analysis engine 118, or a composite score based on an image quality value and an image confidence score.

In certain exemplary embodiments, the IQA engine 116 analyzes the quality of each image. The IQA engine 116 can produce an image quality value that indicates the quality of the electronic image. For example, the IQA engine 116 can rate each electronic image on a quality scale, such as a scale comprising the ratings of 0 to 9 or Blank or M or U or E or P.

A rating having a value of "9" can indicate a high-quality image, while a rating having a value of "0" can indicate very low quality image. Any suitable metric of image quality can be used to develop the image quality rating. For example, the IQA engine 116 can detect streaks on the image, skew of the image, orientation of the image, pixel count, image data size, or any other suitable quality factor and can determine a result corresponding to an amount of each factor present in the electronic image.

The IQA engine 116 can compare the determined result for each metric with a translation table to obtain the image quality value for the analyzed electronic image. In certain exemplary embodiments, the translation table can comprise results correlated with image quality values, and the IQA engine 116 can determine the image quality rating based on the corresponding image quality values in the translation table.

According to an exemplary embodiment, the IQA engine 116 can produce a value for each metric analyzed by the IQA engine 116. The image quality value can be based on the lowest value for all of the metrics. Alternatively, the image quality value can comprise a composite value based on the values for two or more of the metrics. In another exemplary embodiment, the IQA engine can produce high, low, and median values for each metric, and the image quality value can be based on one or more of those values.

The check processing module 108 reads an image quality threshold associated with the intended purpose of an image from the threshold database 115. The intended purpose of the image can be based on the receiving institution's 120 preferred delivery method. The check processing module 108 compares the image quality threshold to the image quality value produced by the IQA engine 116. If the image quality value meets or exceeds the image quality threshold, the check processing module 108 prepares the proper delivery method for forwarding to the receiving institution 120. In certain exemplary embodiments, if the image quality value does not meet the image quality threshold, the check processing module 108 can send a notification to the sending institution 102 and/or an operator of the check processor 105, advising the sending institution 102 and/or operator that the image is not suitable and/or requesting submission of a new or corrected, suitable image.

In an alternative exemplary embodiment, the rejected image can be forwarded to an image usability analysis engine 118. The image usability analysis engine 118 can further assess the quality of the image. The image usability analysis engine 118 can develop an image confidence score indicating a usability rating for the image. The check processing module 108 can compare the image confidence score to the image quality threshold to determine whether the image is suitable for its intended use. If not, the check processing module 108 can send a notification to the sending institution 102 and/or an operator of the check processor 105, advising the sending institution 102 and/or operator that the image is not suitable and/or requesting submission of a new or corrected, suitable image. If the confidence score meets or exceeds the image quality threshold, the check processing module 108 can prepare the proper form of delivery for the check to the receiving institution 120 based on the receiving institution's 120 preferences.

In another alternative exemplary embodiment, the image confidence score can be combined with the image quality value to create a composite score that indicates the quality and usability of the image. In that case, the check processing module 108 can compare the composite score to the image quality threshold to determine whether the image is acceptable for further processing. If not, the check processing module 108 can send a notification to the sending institution 102 and/or an operator of the check processor 105, advising the sending institution 102 and/or operator that the image is not suitable and/or requesting submission of a new or corrected, suitable image. If the composite score meets the image quality threshold, then the check processing module 108 can prepare the proper form of delivery for the check to the receiving institution 120 based on the receiving institution's 120 preferences.

As discussed previously, the image usability engine 118 can assess the usability of the electronic image to generate an image quality rating. In this case, the quality rating can be based on a confidence score produced by the image usability engine 118. The confidence score indicates the probability that the electronic image includes the necessary information to properly process the check. To develop a confidence score, the image usability engine 118 can examine different portions of the check to determine whether the proper information is present. For example, the image usability engine 118 can examine the currency amount portion of the check by using a recognition program to determine whether an amount is present and a probability that it recognized the correct amount. The probability can indicate the confidence that the required information is present and readable. The image usability engine 118 can analyze multiple portions of the check, such as the MICR code line, currency amount, signature, date, payee, endorsements, or any other portion in which information is required. The confidence score can be based on the probabilities of one or more portions. In certain exemplary embodiments, the confidence score can be based on the lowest probability out of all of the portions, or the confidence score can be based on a composite of two or more of the probabilities for different portions.

In certain exemplary embodiments, the quality rating can be based entirely on the confidence score produced by the image usability analysis engine 118. Alternatively, the quality rating can include a composite score based on the confidence score produced by the image usability engine 118 and the image quality value produced by the IQA engine 116.

If the check processing module 112 determines that the image quality rating does not meet the image quality threshold associated with the electronic image's purpose in the threshold database 115, then the check processing module 112 rejects the image. In that case, the best fit clearing module 110 specially rejects the electronic image and sorts the electronic image and financial data for return to the sending institution 102 or an operator of the check processor 105 for correction, depending on which entity created the image.

In another alternative exemplary embodiment, the image quality rating can be based on the confidence score of the image usability engine without first assessing the image quality via the IQA engine 116.

The image quality assessment discussed above can be performed for the front side image, back side image, or both for each document.

Figure 2:
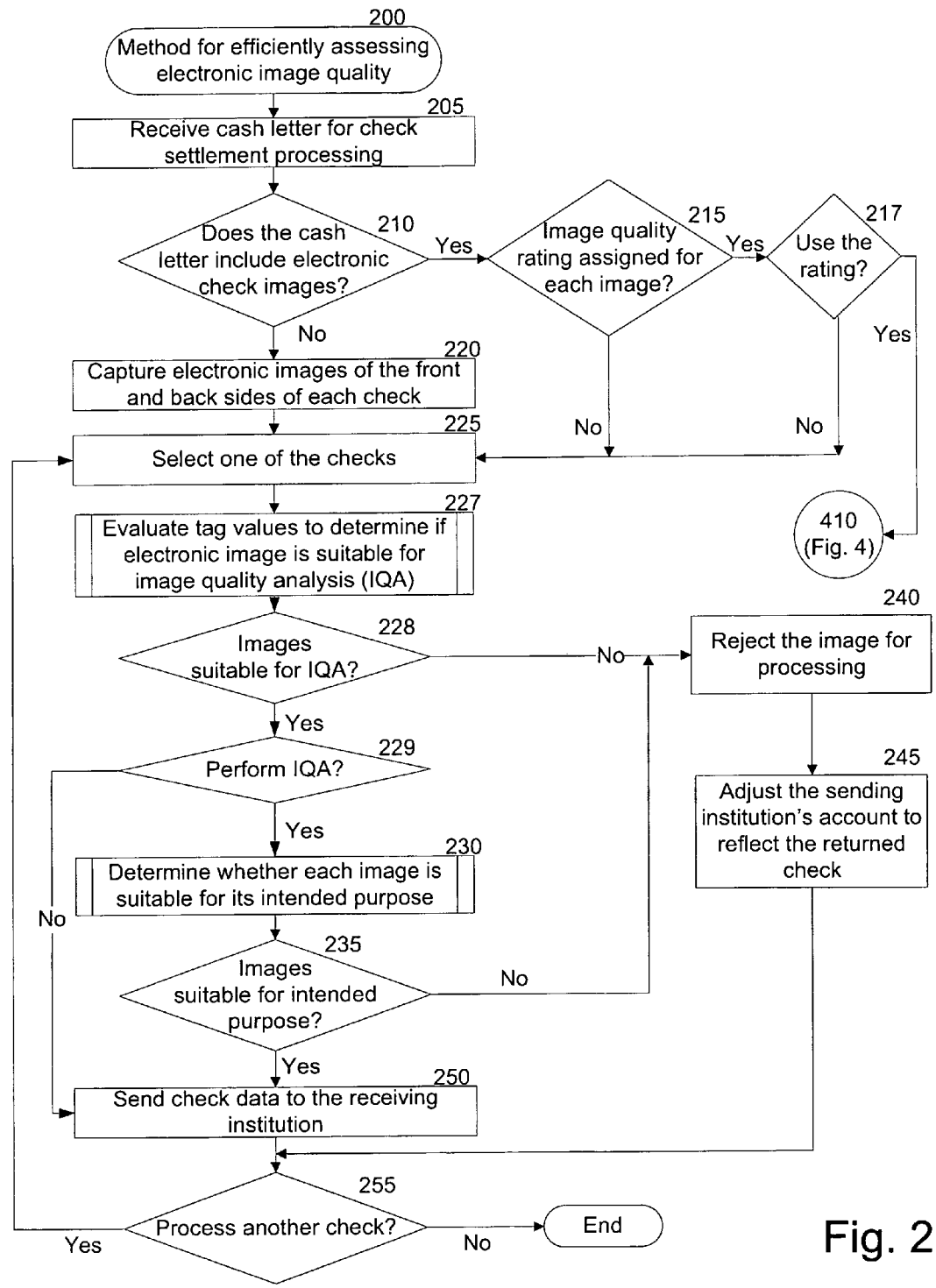
FIG. 2 is a flow chart illustrating a method for efficiently assessing electronic image quality, in accordance with certain exemplary embodiments of the invention.

FIG. 2 is a flow chart illustrating a method 200 for efficiently assessing electronic image quality, in accordance with certain exemplary embodiments of the invention. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described below with reference to FIGS. 1 and 2.

In step 205, the check processor 105 receives a cash letter from the sending institution 102 for check settlement processing. In step 210, the check processor 105 determines whether the cash letter includes one or more electronic check images. If the check processor 105 received an image cash letter from the sending institution 102 in step 205, then the cash letter includes one or more electronic check images. If, in step 205, the check processor 105 received a paper cash letter from the sending institution 102, then the cash letter does not include electronic check images.

If the check processor 105 determines in step 210 that the cash letter includes electronic check images, then the method 200 branches to step 215. In step 215, the check processing module 108 determines whether an image quality rating is already assigned by the sending institution 102 for each image provided in the image cash letter. If not, then the method 200 branches to step 225, which is discussed in more detail below. If the check processor 105 determines in step 215 that an image quality rating is assigned for each image, then the method 200 branches to step 217. In step 217, the check processor 105 determines whether to use the image quality rating already assigned to each image. If the check processor 105 determines in step 217 to use the image quality rating already assigned to each image, then the method 200 branches to step 410 of FIG. 4, which is discussed in more detail below. If the check processor 105 determines in step 217 not to use the image quality rating already assigned to each image, then the method 200 branches to step 225, which is discussed in more detail below.

If the check processor 105 determines in step 210 that the cash letter did not include any electronic check images, then the method 200 branches to step 220. In step 220, the MICR/image capturing device 106 of the check processor 105 captures electronic images of the front and back sides of each check. The MICR/image capturing device 106 also captures the financial data from the MICR code line on each check. In certain alternative exemplary embodiments, the method 200 can branch from step 210 to step 220 even if the cash letter included electronic check images. For example, the check processor 105 may desire to capture its own images and/or assign its own image quality ratings for each check, rather than relying on the images and ratings provided by the sending institution 102.

In step 225, the check processing module 108 selects one of the checks. In step 227, the check processing module 108 performs tag validation on one or more electronic images of the selected check to determine whether each electronic check image is suitable for image quality analysis. For example, the check processing module 108 can perform tag validation on images of the check's front and/or back sides. Step 227 will be discussed in more detail below with reference to FIG. 3.

Step 228 is a decision block indicating a determination of whether each check image is suitable for image quality analysis, based on the results of step 227. If any of the electronic check images are not suitable for image quality analysis, then the method 200 branches to step 240. In step 240, the check processing module 108 rejects the image(s) for processing. For example, the check processing module 108 can suspend processing of the check associated with the image(s) and/or send a notification to the sending institution 102 and/or an operator of the check processor 105, advising the sending institution 102 and/or operator of the unsuitability of the image(s) and/or requesting submission of one or more new or corrected, suitable images. In certain exemplary embodiments, the notification can include a failure value assigned to the image. The failure value is described in more detail below, in connection with step 340 of FIG. 3. Alternatively, the check processor 105 can clear a paper check associated with the rejected image(s).

If the check processing module 108 determines in step 228 that each electronic check image is suitable for image quality analysis, then the method 200 branches to step 229. In step 229, the check processing module 108 determines whether to perform image quality analysis on the electronic check image. If the check processing module 108 determines in step 229 not to perform image quality analysis on the electronic check image(s), then the method 200 branches to step 250, which is discussed below. If the check processing module 108 determines in step 229 to perform image quality analysis on the electronic check image(s), then the method 200 branches to step 230.

In step 230, the check processing module 108 determines whether each image is suitable for its intended purpose. For example, the check processing module 108 can make this determination for images of the check's front and/or back sides. Step 230 will be discussed in more detail below with reference to FIG. 4.

Step 235 is a decision block indicating a determination of whether each check image is suitable for its intended purpose, based on the results of step 230. If any of the check images is not suitable for its intended purpose, then the method 200 branches to step 240, as discussed above. Alternatively, the check processing module 108 determines in step 235 that each image is suitable for its intended purpose, then the method branches to step 250.

In step 250, the check processing module 108 sends information regarding the check to the receiving institution 120. For example, the check processing module 108 can send the check information to the receiving institution 120 in accordance with certain delivery preferences of the receiving institution 120. In step 255, the check processing module 108 determines whether to process another check. If so, then the method 200 branches back to step 225 to select another check. If the check processing module 108 determines in step 255 not to process another check, then the method 200 ends.

Figure 3:
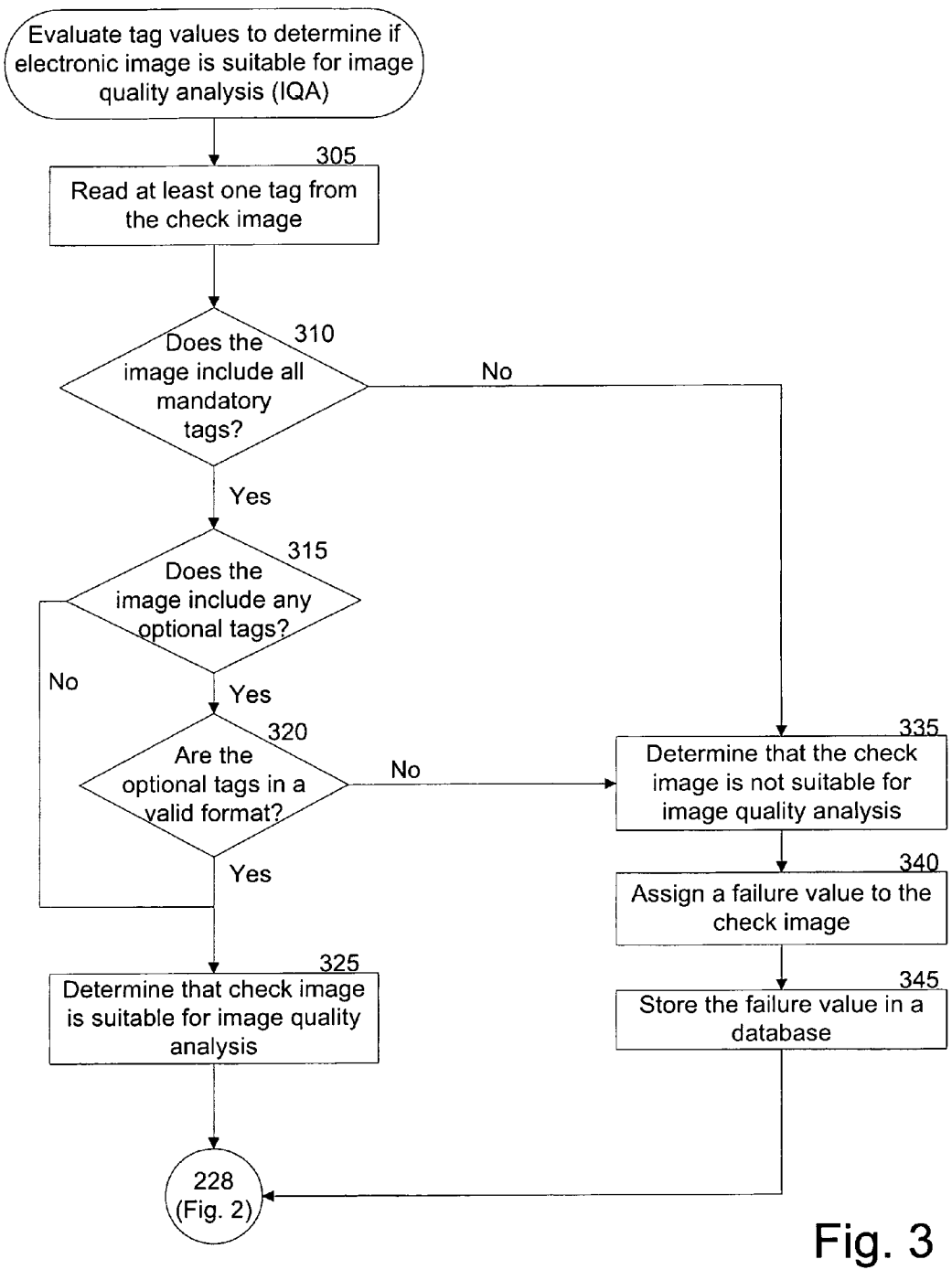
FIG. 3 is a flow chart illustrating a method for determining whether an electronic check image is suitable for image quality analysis, in accordance with certain exemplary embodiments of the invention.

FIG. 3 is a flow chart illustrating a method 227 for determining whether an electronic check image is suitable for image quality analysis, in accordance with certain exemplary embodiments of the invention, as referred to in step 227 of FIG. 2. The exemplary method 227 is illustrative and, in alternative embodiments of the invention, certain steps can be performed in a different order, in parallel with one another, or omitted entirely, and/or certain additional steps can be performed without departing from the scope and spirit of the invention. The method 227 is described below with reference to FIGS. 1-3.

In step 305, the check processing module 108 reads one or more tags in the electronic check image. In step 310, the check processing module 108 determines whether the electronic check image includes a predetermined selection of mandatory tags. The mandatory tags are tags, which must be present in the electronic check image for the image to be suitable for image quality analysis. For example, the selection of mandatory tags can include tags required in accordance with a bank-specific standard and/or an industry standard, such as ANSI X9.100-181, entitled "Specifications for TIFF Image Format for Image Exchange." In certain exemplary embodiments, the check processing module 108 can access a listing of the mandatory tags stored in a validation database 113 of the check processor 105. For example, in certain exemplary embodiments, the mandatory tags can include one or more of the following tags: ImageWidth, ImageLength, Compression, PhotometricInterpretation, StripOffsets, RowsPerStrip, StripByteCounts, XResolution, and YResolution.

If the check processing module 108 determines in step 310 that the electronic check image does not include all of the selection of mandatory tags, then the method 227 branches to step 335, which is described below. If the check processing module 108 determines in step 310 that the electronic check image includes all of the selection of mandatory tags, then the method 227 branches to step 315. In step 315, the check processing module 108 determines whether the electronic check image includes any non-mandatory, "optional" tags. The optional tags are tags, which do not have to be present in the electronic check image for the image to be suitable for image quality analysis. For example, the optional tags can include tags identified as "optional" in a bank-specific standard and/or an industry standard, such as ANSI X9.100-181, entitled "Specifications for TIFF Image Format for Image Exchange." In certain exemplary embodiments, any optional tags present in the electronic check image must be "valid," i.e., in a correct format or including appropriate content, for the electronic check image to be suitable for image quality analysis. In certain exemplary embodiments, the check processing module 108 can access a listing of the optional tags stored in the validation database 113. For example, in certain exemplary embodiments, the optional tags can include one or more of the following tags: NewSubfileType, BitsPerSample, Thresholding, FillOrder, Orientation, SamplesPerPixel, T6Options, and ResolutionUnit.

If the check processing module 108 determines in step 315 that the electronic check image does not include any optional tags, then the method 227 branches to step 325, which is discussed below. If the check processing module 108 determines in step 315 that the electronic check image includes any optional tags, then the method 227 branches to step 320.

In step 320, the check processing module 108 determines whether the optional tags present in the image are valid. For example, the check processing module 108 can determine whether the optional tags are valid by determining whether each optional tag is in a proper format and/or includes appropriate content. In certain exemplary embodiments, this determination can be based on one or more bank-specific and/or industry standards, such as ANSI X9.100-181, entitled "Specifications for TIFF Image Format for Image Exchange."

If the check processing module 108 determines in step 320 that the optional tags are valid, then the method 227 branches to step 325. In step 325, check processing module 108 determines that the electronic check image is suitable for image quality analysis. The method 227 branches to step 228 on FIG. 2.

If the check processing module 108 determines in step 320 that the optional tags are not valid, then the method 227 branches to step 335. In step 335, the check processing module 108 determines that the electronic check image is not suitable for image quality analysis. In step 340, the check processing module 108 assigns a failure value to the electronic check image. The failure value includes information regarding the unsuitability of the image, such as a reason why the image is not suitable for image quality analysis. In step 345, check processing module 108 stores the failure value. For example, the check processing module 108 can store the failure value in the validation database 113.

In certain alternative exemplary embodiments, the check processing module 108 can perform a similar analysis regarding the validity of all mandatory tags present in the image prior to determining whether the optional tags exist in step 315. For example, the check processing module 108 can determine whether the mandatory tags are valid by determining whether each mandatory tag is in a proper format and/or includes appropriate content. In certain exemplary embodiments, this determination can be based on one or more bank-specific and/or industry standards, such as ANSI X9.100-181, entitled "Specifications for TIFF Image Format for Image Exchange."

Figure 4:
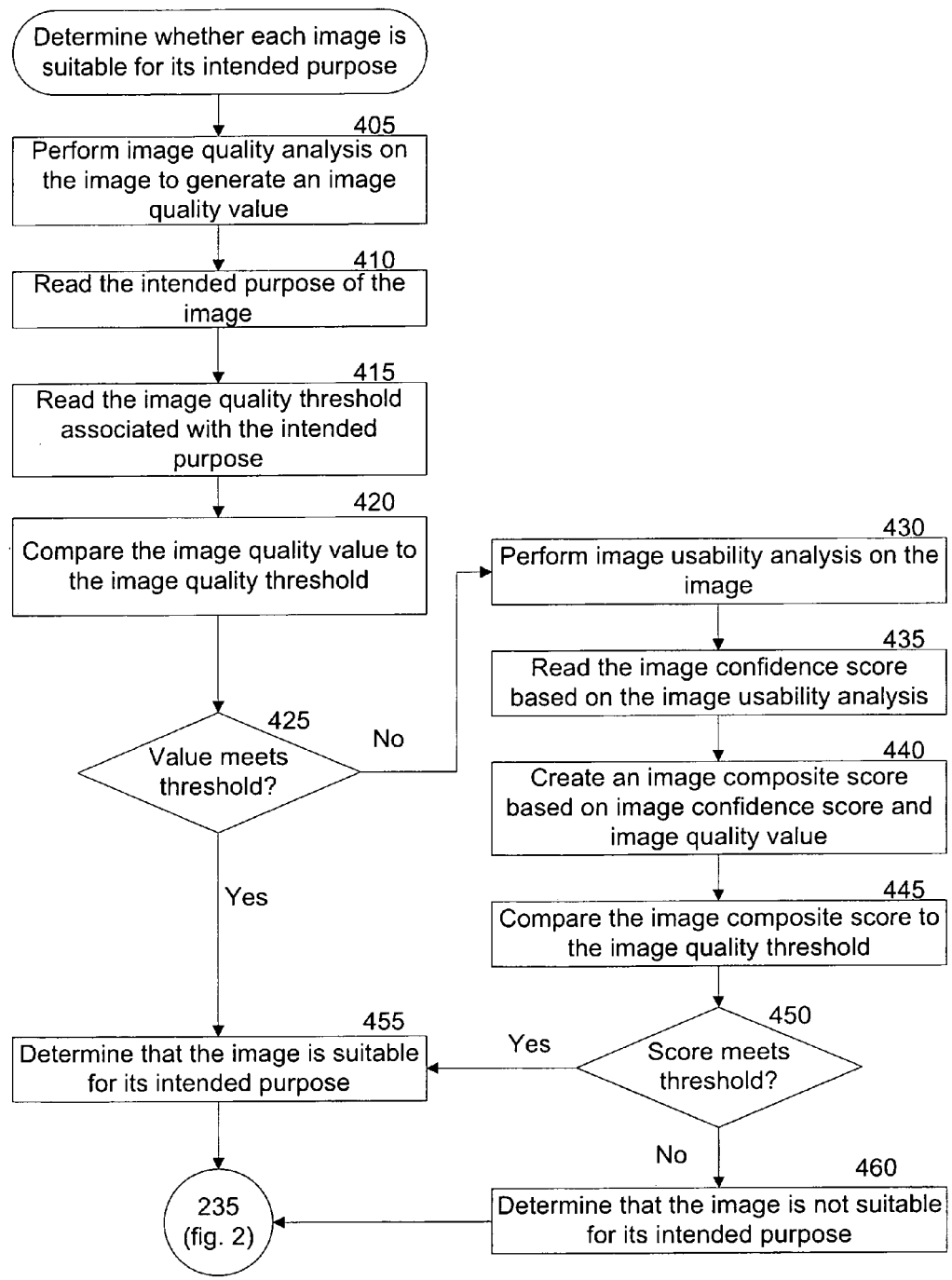
FIG. 4 is a flow chart illustrating a method for determining whether an electronic check image is suitable for its intended purpose according to an exemplary embodiment of the invention.

FIG. 4 is a flow chart illustrating a method 230 for determining whether a check image is suitable for its intended purpose, in accordance with certain exemplary embodiments of the invention, as referred to in step 230 of FIG. 2. The exemplary method 230 is illustrative and, in alternative embodiments of the invention, certain steps can be performed in a different order, in parallel with one another, or omitted entirely, and/or certain additional steps can be performed without departing from the scope and spirit of the invention. The method 230 is described below with reference to FIGS. 1-2 and 4.

In step 405, the IQA engine 116 performs image quality analysis on the selected image to generate an image quality value for the image. The check processing module 108 can read the image quality value associated with the check's image. In step 410, the check processing module 108 reads the intended use of the image. The intended use of the image is based on the receiving institution's 120 preferences for receiving checks for presentment. The receiving institution's 120 preferences are stored in the customer profile database 112. The preferences also are indicated by the clearing method identified by the best fit clearing module 110, as described above with reference to FIG. 1.

In step 415, the check processing module 108 reads the image quality threshold associated with the intended use from the threshold database 115. The image quality threshold can be established based on the intended purpose of the check. Accordingly, different check purposes can have different quality thresholds.

In step 420, the check processing module 108 compares the image quality value to the image quality threshold. In step 425, the check processing module 108 determines whether the image quality value meets the image quality threshold. If so, then the method 230 branches to step 455, in which the check processing module 108 determines that the image is suitable for its intended purpose. The method 230 then branches to step 235 of FIG. 2.

Alternatively, if, in step 425, the check processing module 108 determines that the image quality value does not meet the image quality threshold, then the method 230 branches to step 430. In step 430, the image usability analysis engine 118 performs an image usability analysis on the image. The image usability analysis engine 118 generates a confidence score that indicates a probability of the electronic image being suitable for its intended purpose. In step 435, the check processing module 108 reads the image confidence score created by the image usability analysis engine 118. In step 440, the check processing module 108 creates an image composite score based on the image confidence score and the image quality value. In step 445, the check processing module 108 compares the image composite score to the image quality threshold to determine if the image is suitable for its intended purpose. In step 450, the check processing module 108 determines whether the composite score meets the image quality threshold. If so, then the method 230 branches to step 455 in which the check processing module 108 determines that the image is suitable for its intended purpose. The method 230 then branches to step 235 of FIG. 2.

If the check processing module 108 determines in step 450 that the image composite score does not meet the image quality threshold, then the method 230 branches to step 460. In step 460, the check processing module 108 determines that the image is not suitable for its intended use. The method 230 then branches to step 235 of FIG. 2.

In certain alternative exemplary embodiments, if the check processing module 108 determines in step 425 that the image quality value does not meet the image quality threshold, then the method 230 can branch directly to step 460. In certain other alternative exemplary embodiments, step 440 can be omitted. In that case, in step 445, the check processing module 108 compares the image confidence score to the image quality threshold to determine whether the image is suitable for its intended purpose.

In yet other alternative exemplary embodiments, steps 405, 420, 425, and 440 can be omitted. For these alternative embodiments, the check processing module 108 reads the intended purpose of the image in step 410 and reads the image quality threshold associated with that intended purpose in step 415. In turn, the image usability analysis engine 118 performs analysis on the image in step 430. In step 435, the check processing module 108 reads an image confidence score, based on the image usability analysis. In step 445, the check processing module 108 compares this image confidence score to the image quality threshold read in step 415. In step 450, the check processing module 108 determines whether the image confidence score meets or exceeds the image quality threshold. If so, the method 230 branches to step 455. In step 455, the check processing module 108 determines that the image is suitable for its intended purpose. If, on the other hand, the inquiry of step 450 results in a negative response, the method 230 branches to step 460. In step 460, the check processing module 108 determines that the image is not suitable for its intended purpose. From step 455 or step 460, the method 230 branches to step 235 of FIG. 2.

In certain exemplary embodiments, if the check processing module 108 determines in step 215 of FIG. 2 that each image already has an assigned image quality rating, then the check processing module 108 can use the image quality ratings supplied by the sending institution 102 in step 405 of FIG. 4 and use it as the image quality value. Additionally, if the supplied quality rating includes an image confidence score, then the check processing module 108 can read the supplied quality rating in step 435 of FIG. 4 and use it as the image confidence score.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for determining whether an electronic check image is suitable for image quality analysis, comprising the steps of:
   reading, by a computer, an electronic check image comprising a plurality of tags;
   determining, by the computer, whether the plurality of tags meet a tag standard;
   in response to determining that the plurality of tags do not meet the tag standard, determining, by the computer, that the electronic check image is not suitable for image quality analysis;
   in response to determining that the plurality of tags meet the tag standard, determining, by the computer, that the electronic check image is suitable for image quality analysis and performing an image quality analysis on the electronic check image to produce an image quality value;
   determining, by the computer, an intended purpose of the electronic check image;
   reading, by the computer, an image quality threshold based on the intended purpose of the electronic check image;
   comparing, by the computer, the image quality threshold with the image quality value;
   in response to determining that the image quality value does not meet the image quality threshold, performing, by the computer, an image usability analysis on the electronic check image and reading an image confidence score based on the image usability analysis; and
   creating, by the computer, an image composite score based on the image confidence score and the image quality value.

2. The method according to claim 1, wherein the step of determining whether the plurality of tags meet the tag standard comprises the steps of:
   determining, by the computer, whether the plurality of tags comprise a predetermined selection of at least one mandatory tag; and
   in response to determining that the plurality of tags do not comprise the predetermined selection of at least one mandatory tag, determining, by the computer, that the plurality of tags do not meet the tag standard.

3. A computer-implemented method for determining whether an electronic check image is suitable for image quality analysis, comprising the steps of:
   reading, by a computer, an electronic check image comprising a plurality of tags;
   determining, by the computer, whether the plurality of tags meet a tag standard; and
   in response to determining that the plurality of tags do not meet the tag standard, determining, by the computer, that the electronic check image is not suitable for image quality analysis, wherein determining whether the plurality of tags meet the tag standard comprises
   determining, by the computer, whether the plurality of tags comprise any optional tags;
   in response to determining that the plurality of tags comprise any optional tags, determining, by the computer, whether any optional tag in the plurality of tags is invalid; and
   in response to determining that any optional tag in the plurality of tags is invalid, determining, by the computer, that the plurality of tags do not meet the tag standard.

4. The method according to claim 3, further comprising the step of:
   in response to determining that no optional tag in the plurality of tags is invalid, determining, by the computer, that the plurality of tags meet the tag standard.

5. The method according to claim 1, wherein the step of determining that the electronic check image is not suitable for image quality analysis further comprises the step of assigning, by the computer, a failure value to the electronic check image.

6. The method according to claim 5, further comprising the step of reporting, by the computer, the failure value to an entity that created the electronic check image.

7. The method according to claim 5, further comprising the step of storing, by the computer, the failure value in a database.

8. A computer-implemented method for determining whether an electronic check image is suitable for image quality analysis, comprising the steps of:
   reading, by a computer, an electronic check image comprising a plurality of tags;
   determining, by the computer, whether the plurality of tags comprise a predetermined selection of at least one mandatory tag;
   in response to determining that the plurality of tags do not comprise the predetermined selection of at least one mandatory tag, determining, by the computer, that the electronic check image is not suitable for image quality analysis;
   in response to determining that the plurality of tags comprise the predetermined selection of at least one mandatory tag, determining, by the computer, that the electronic check image is suitable for image quality analysis and performing an image quality analysis on the electronic check image to produce an image quality value;
   determining, by the computer, an intended purpose of the electronic check image;
   reading, by the computer, an image quality threshold based on the intended purpose of the electronic check image;
   comparing, by the computer, the image quality threshold with the image quality value;
   in response to determining that the image quality value does not meet the image quality threshold, performing, by the computer, an image usability analysis on the electronic check image and reading an image confidence score based on the image usability analysis; and
   creating, by the computer, an image composite score based on the image confidence score and the image quality value.

9. A computer-implemented method for determining whether an electronic check image is suitable for image quality analysis, comprising the steps of:
   reading, by a computer, an electronic check image comprising a plurality of tags;
   determining, by the computer, whether the plurality of tags comprise a predetermined selection of at least one mandatory tag;
   in response to determining that the plurality of tags do not comprise the predetermined selection of at least one mandatory tag, determining, by the computer, that the electronic check image is not suitable for image quality analysis;
   in response to determining that the plurality of tags comprise the predetermined selection of at least one mandatory tag, determining, by the computer, whether the plurality of tags comprise any optional tags;

in response to determining that the plurality of tags comprise any optional tags, determining, by the computer, whether any optional tag in the plurality of tags is invalid; and in response to determining that any optional tag in the plurality of tags is invalid, determining, by the computer, that the electronic check image is not suitable for image quality analysis.

10. The method according to claim 9, further comprising the steps of:

in response to determining that no optional tag in the plurality of tags is invalid, determining, by the computer, that the electronic check image is suitable for image quality analysis.

11. The method according to claim 8, wherein the step of determining not to perform an image quality analysis on the electronic check image further comprises the step of assigning, by the computer, a failure value to the electronic check image.

12. The method according to claim 11, further comprising the step of reporting, by the computer, the failure value to an entity that created the electronic check image.

13. The method according to claim 11, further comprising the step of storing, by the computer, the failure value in a database.

14. A system for determining whether an electronic check image is suitable for image quality analysis, comprising:
a communications network; and
a processor configured to
receive an electronic check image via the communications network, the electronic check image comprising a plurality of tags,
determine whether the plurality of tags comprise any optional tags,
in response to determining that the plurality of tags comprise any optional tags, determine whether any optional tag in the plurality of tags is invalid,
in response to determining that any optional tag in the plurality of tags is invalid, determine that the plurality of tags do not meet the tag standard, and
in response to determining that the plurality of tags do not meet the tag standard, determine that the electronic check image is not suitable for image quality analysis.

15. The system according to claim 14, wherein the processor is further configured to, in response to determining that no optional tag in the plurality of tags is invalid, determine that the plurality of tags meet the tag standard.

* * * * *